United States Patent
Bowling et al.

(10) Patent No.: US 7,377,193 B2
(45) Date of Patent: May 27, 2008

(54) AUTOMOTIVE STEERING MECHANISM HOUSING

(75) Inventors: Bruce Allen Bowling, Redford, MI (US); Edward Francis McElmeel, Jr., Milan, MI (US); Sunil Palakodati, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 381 days.

(21) Appl. No.: 10/442,388

(22) Filed: May 21, 2003

(65) Prior Publication Data

US 2004/0232642 A1 Nov. 25, 2004

(51) Int. Cl.
*F16H 35/00* (2006.01)
*B60D 1/02* (2006.01)

(52) U.S. Cl. .................. 74/388 PS; 280/515
(58) Field of Classification Search .......... 74/492, 74/493, 388 PS; 280/93.515; 180/444
See application file for complete search history.

(56) References Cited

U.S. PATENT DOCUMENTS

| | | | |
|---|---|---|---|
| 1,823,028 A | 9/1931 | Caldwell | |
| 2,338,090 A | 1/1944 | Bradfield | |
| 4,008,627 A | 2/1977 | Bradshaw et al. | |
| 4,314,710 A | 2/1982 | Kamoshita et al. | |
| 4,681,349 A | 7/1987 | Press et al. | |
| 4,827,788 A * | 5/1989 | Beer et al. | 74/422 |
| 5,251,717 A | 10/1993 | Klosterhaus | |
| 5,285,864 A * | 2/1994 | Martin et al. | 180/417 |
| 5,730,244 A | 3/1998 | Engler et al. | |
| 6,273,210 B1 * | 8/2001 | Saito et al. | 180/444 |
| 6,543,569 B1 * | 4/2003 | Shimizu et al. | 180/444 |
| 2002/0125672 A1 | 9/2002 | Lee | |

FOREIGN PATENT DOCUMENTS

| | | |
|---|---|---|
| EP | 1 129 925 A1 | 5/2001 |
| EP | 1129925 A1 * | 9/2001 |

* cited by examiner

*Primary Examiner*—Richard Ridley
*Assistant Examiner*—Justin Krause
(74) *Attorney, Agent, or Firm*—Brinks Hofer Gilson & Lione

(57) ABSTRACT

A composite tubular housing for an automotive steering system, preferably an electronic power assist steering system, is formed of seamless metal tube section welded into an integral component. The housing includes a rack section and a pinion section having an opening that is welded to the rack section. A yoke section is formed of a tube having an end that is welded to the rack section opposite the pinion section. The pinion section may contain a drive pinion coupled to a steering wheel of the vehicle. The housing may also include sections for an assist pinion coupled to an electric motor, and a yoke which are attached to the rack section apart from the drive pinion.

5 Claims, 3 Drawing Sheets

AUTOMOTIVE STEERING MECHANISM HOUSING

TECHNICAL FIELD OF THE INVENTION

This invention relates to a rack and pinion steering mechanism for an automotive vehicle. More particularly, this invention relates to a composite tubular housing for such steering mechanism.

BACKGROUND OF THE INVENTION

A typical steering system for an automotive vehicle comprises a rack and pinion mechanism. The rack is operatively connected to wheels of the vehicle and includes teeth. The pinion, also referred to as the drive pinion, engages the rack teeth and is operatively coupled to the steering wheel. A yoke assembly is disposed opposite the pinion to bias the rack against the pinion and prevent slippage. During operation, an operator inputs a steering command by turning the steering wheel to rotate the pinion, which in turn laterally displaces the rack to change the orientation of the wheels.

To reduce the steering force needed by the operator to turn the steering wheel, the vehicle may be equipped with an electric power assist steering system, referred to as EPAS. A conventional EPAS system comprises a second pinion that engages a separate section of the rack and is driven by an electric motor. In response to a steering command from the operator, the motor is actuated to rotate the pinion and thereby reduce the force required to displace the rack.

The drive pinion and yoke are contained within a housing that is a die casting. The die casting includes a bore for the drive pinion, a bore for the section of the rack and a bore for the yoke. These bores are arranged in different angles. During die casting, the bores are formed by cores that are connected to mechanisms that retract the cores to allow the casting to be released from the mold. The assist pinion, which also requires a housing, is located at a separate section of the rack, spaced apart from the drive pinion, and is oriented in still a different direction than the drive pinion. Extension of the rack coring, and the additional slide coring for the assist pinion, add substantially to the complexity and cost of the die casting, making a singular die cast housing prohibitively expensive. Thus, dual pinion steering mechanisms for EPAS systems use separate housings for the drive pinion and the assist pinion, which adds to the number of components and complexity of the manufacturing operations.

Therefore, a need exists for a housing that includes sections for containing a rack, a pinion and a yoke, and that may be readily manufactured without the complexity and cost of slide coring such as needed for die casting.

In addition, a need exists for a dual pinion steering mechanism that includes an integral housing that is readily manufactured as a single component, which housing includes an elongated rack section and separate drive pinion and assist pinion sections that may be independently oriented as desired to optimize the mechanism as needed to meet onboard spatial constraints.

BRIEF SUMMARY OF THE INVENTION

In a preferred embodiment, this invention provides a composite tubular housing for an automotive steering system that includes a rack, a pinion engaging the rack, and a yoke for biasing the rack against the pinion. The pinion may be either a drive pinion coupled to a steering column and steering wheel or an assist pinion coupled to an electric motor. The composite tubular housing comprises a rack section that is formed of a seamless metal tube symmetrical about a first axis and defines a first opening and a second opening that are symmetrical about a second axis perpendicular to the first axis. The composite tubular housing further comprises a pinion section formed of a seamless metal tube that is symmetrical about a pinion axis that intersects the second axis. The pinion section includes a pinion opening that is symmetrical about the second rack axis and is welded to the rack section about the first opening. The composite tubular housing further includes a yoke section that is formed of a seamless metal tube symmetrical about the second rack axis and includes an open end welded to the rack section about the second opening. Thus, this invention provides a housing that is formed of seamless metal tubing that is welded into a single component and includes sections that contain the rack, pinion and yoke of the automotive steering system. The length of the metal sections, and in particular the length of the rack housing section, may be sized as desired to accommodate the particular steering component. The composite tubular housing of this invention is readily manufactured without requiring sliding coring such as in die casting operations, and so reduces the cost of the housing.

In one aspect of this invention, a composite tubular housing is provided for an automotive steering system that includes electric power assist steering. The housing includes a rack section formed of a seamless metal tube having a first axis. The rack section includes a first opening and a second opening symmetrical about a second axis, and also a third opening and a fourth opening symmetrical about a third axis that is spaced apart from the second axis. A drive pinion section for receiving a drive pinion is formed of a seamless metal tube having a drive pinion axis perpendicular to the second axis. The drive pinion section includes a drive pinion opening symmetrical about the second axis and is welded to the rack section about the first opening. A drive yoke section is disposed opposite the rack from the drive pinion. The drive yoke section is formed of a seamless metal tube symmetrical about the second rack axis and includes an open end welded to the rack housing about the second opening. In this aspect of the invention, the housing also includes an assist pinion section for receiving an assist pinion, which is formed of a seamless metal tube having an assist pinion axis perpendicular to the third rack axis. The assist pinion housing section includes an assist pinion opening symmetrical about the third axis and is welded to the rack housing about the third opening. An assist yoke section is provided opposite the rack from the assist pinion and is formed of a seamless metal tube symmetrical about the third axis, with an open end welded to the rack housing section about the fourth opening. Therefore, this invention provides a composite tubular housing that is a singular component and includes housing sections for both the drive pinion and the assist pinion, as well as the related yokes, and which further is readily manufactured from seamless metal tubing at reduced cost, particularly in comparison to die cast housings. It is a further advantage of this aspect of the invention that the drive pinion section and the assist pinion section are independent and that the manufacturing process allows the housings to be independently oriented as desired for a particular application.

BRIEF DESCRIPTION OF THE DRAWINGS

This invention will be further described by reference to the following drawings wherein.

DETAILED DESCRIPTION OF THE INVENTION

Figure 1:
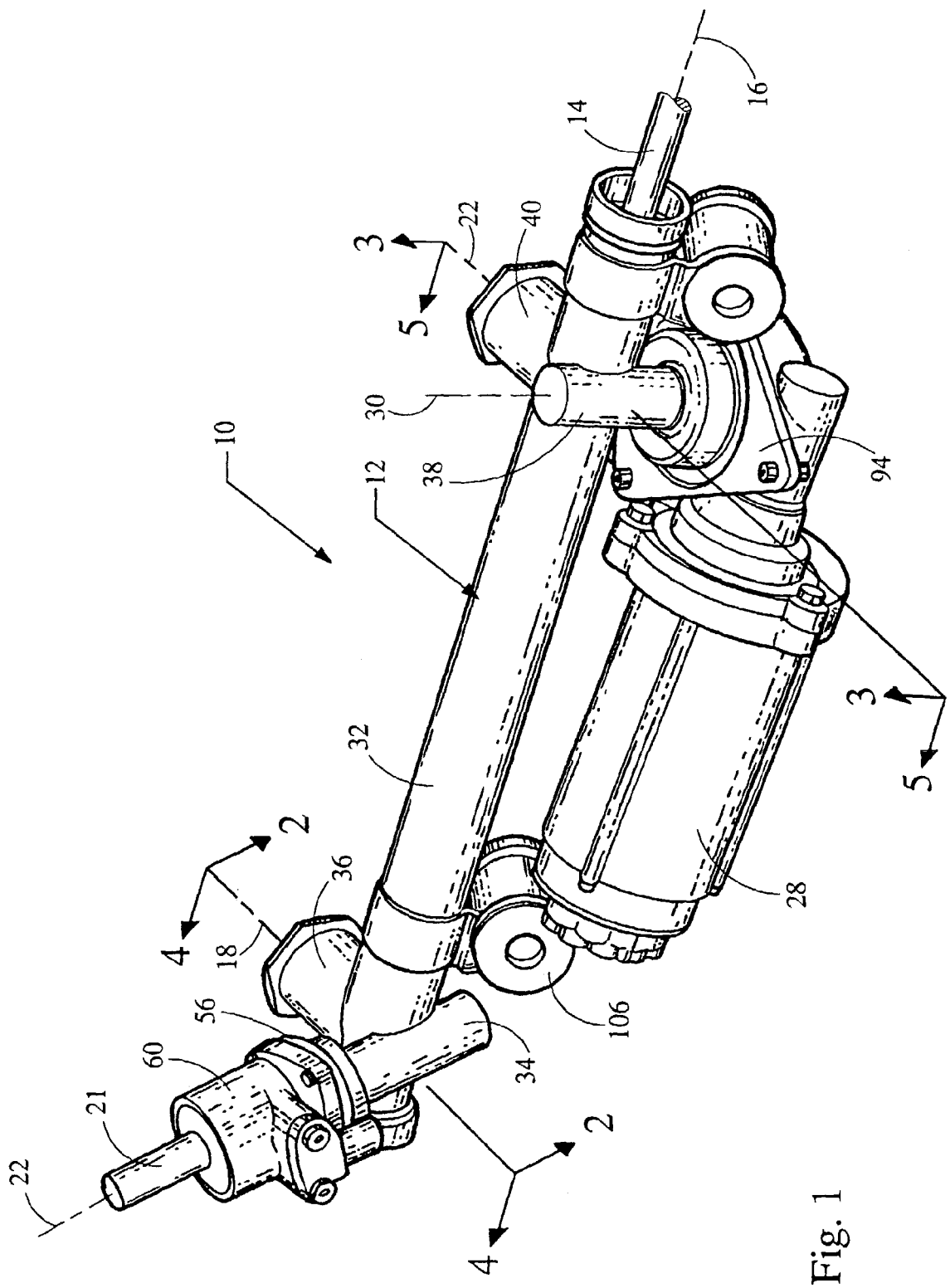
FIG. 1 is a perspective view of an electric power assist steering system in accordance with the preferred embodiment of this invention.

In accordance with a preferred embodiment of this invention, referring to the Figures, an electronic power assist steering system 10 for an automotive vehicle comprises a composite tubular housing 12. The steering system includes, as major elements, a rack 14 elongated along an axis 16 and operatively coupled to wheels of the vehicle. During operation, the rack is axially displaced in response to a steering command from the operator to vary the orientation of the wheels for steering the vehicle. A drive pinion 20, shown in FIG. 4, engages rack 14 at a location corresponding to a second axis 18 that perpendicularly intersects axis 16. Drive pinion 20 is operatively coupled to a steering column 21 and is rotatable about a drive pinion axis 22. Steering column 21 is operatively coupled to a steering wheel, which is turned by the operator to rotate the steering column and thereby rotate the drive pinion, axially displacing rack 14. In this preferred embodiment, system 10 includes an assist pinion 26, shown in FIG. 5, that engages rack 14 at a location corresponding to the perpendicular intersection with third axis 22 and is rotatable on assist axis 30 that is perpendicular to axis 22. Assist pinion 26 is operatively coupled to an electric motor 28. During operation, motor 28 is actuated in response to a steering command from the operator to rotate assist pinion 26 to axially displace rack 14 and thereby reduce the turning force required by the operator turning the steering wheel.

In accordance with this invention, housing 12 includes, as major sections joined into an integral component, a rack section 32, a drive pinion section 34, a yoke section 36 associated with drive pinion section 34, an assist pinion section 38, and a yoke section 40 associated with assist pinion section 38.

Figure 2:
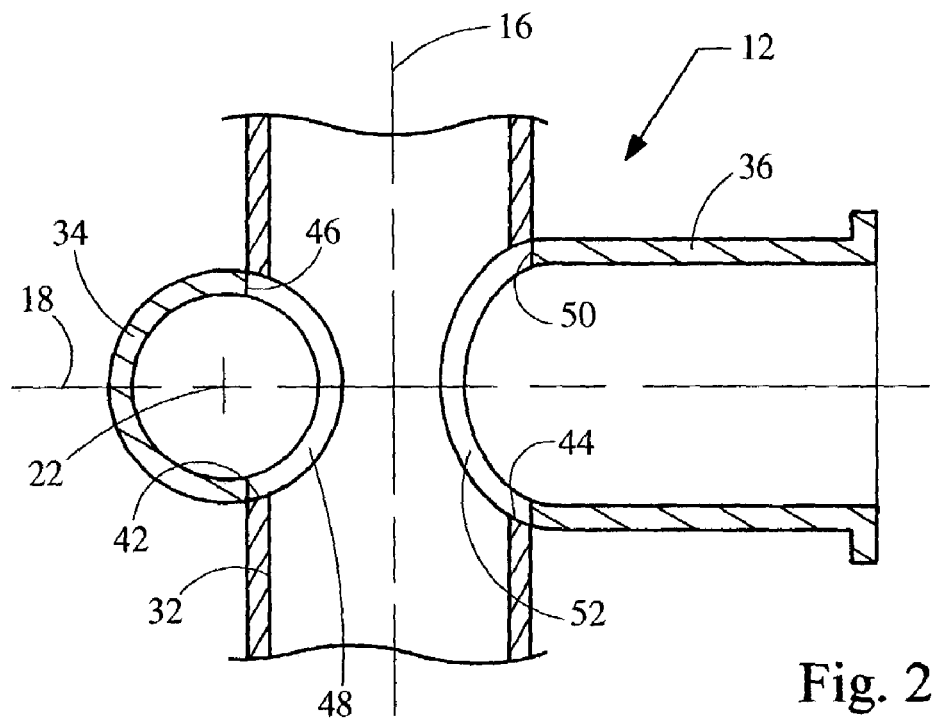
FIG. 2 is a first cross section showing details of the composite tubular housing in FIG. 1 taken along line 2-2.

Rack section 32 is formed of a seamless metal tube and is symmetrical about axis 16 and includes a first opening 42 and a second opening 44 symmetrical about axis 18. Openings 42 and 44 have a saddle shape corresponding to projection of circle onto a cylindrical surface. Drive pinion section 34 includes an opening 46 having a saddle shape and size corresponding to opening 42. Drive pinion section 34 is joined to rack section 32 by a seam weld 48 between opening 42 and opening 46, as shown in FIG. 2. The openings cooperate to provide communication between the interior of drive pinion section 34 and the interior of rack section 32 and thereby provide access for drive pinion 20 to engage rack 14. Yoke section 36 is formed of seamless metal tube that is symmetrical about axis 18. Yoke section 36 has an open end 50 having a saddle shape and size corresponding to second opening 34 and is joined to rack section 32 by a seam weld 52 between open end 50 and second opening 44.

Figure 4:
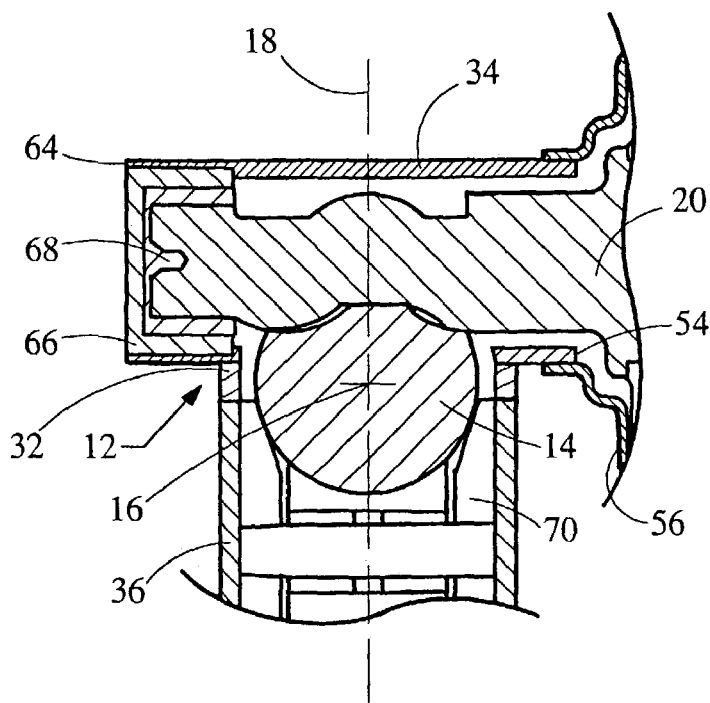
FIG. 4 is a cross sectional view of the steering system in FIG. 1 taken along line 4-4.

Referring now to FIG. 4, there is depicted the arrangement of rack 14 and pinion 20 within rack section 32, drive pinion section 12 and yoke section 36 of housing 12. Drive pinion section 34 includes a first end 54 adjacent steering column 21. A flange 56 is welded to pinion section 34 at first end 54 and holds a radial bearing about pinion 20. A housing 60 for the end of steering column 21 is mounted onto flange 56 by bolts 62. A second end 64 of drive pinion section 34 is internally machined and includes an enlarged diameter for receiving a needle bearing 66 that engages an inner race 68 affixed to the end of drive pinion 20. Within yoke section 36 opposite pinion 20, a sliding yoke 70 is received for biasing rack 14 against drive pinion 20 to prevent slippage during operation.

Figure 3:
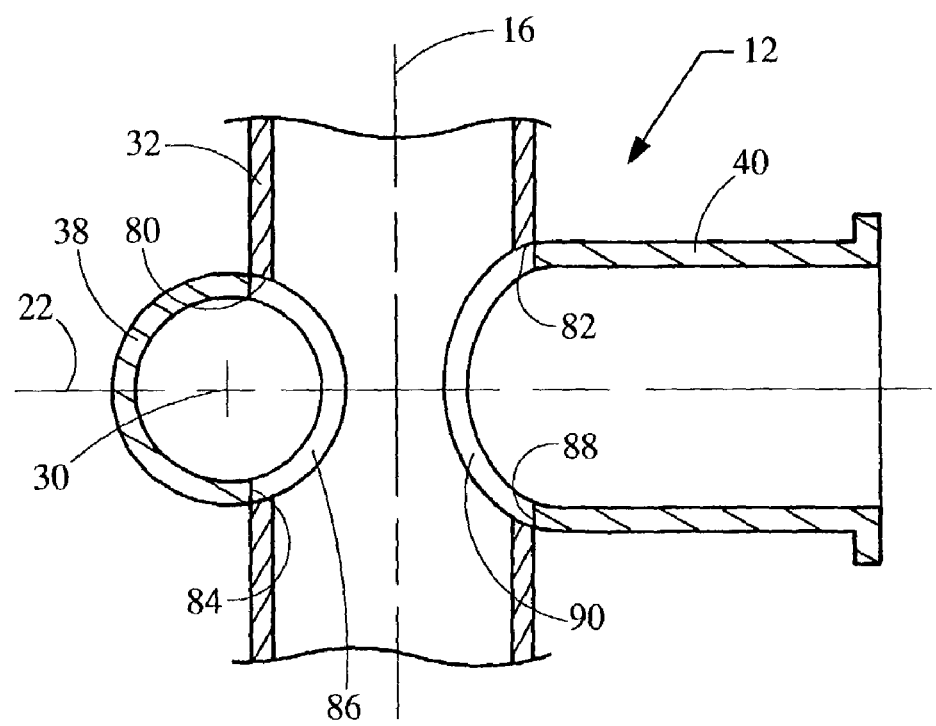
FIG. 3 is a cross sectional view showing details of the housing in FIG. 1 taken along line 3-3.

At the location of assist pinion 26, rack section 32 includes a third opening 80 and a fourth opening 82 symmetrical about axis 22. Openings 80 and 82 have a saddle shape such as defined by a circle projected onto a cylindrical surface, similar to openings 42 and 44. Assist pinion section 38 includes an opening 84 having a saddle shape and size corresponding to opening 80 and is joined to rack section 32 by a seam weld 86 between opening 80 and opening 84. Yoke section 40 is disposed opposite assist pinion section 38. Yoke section 40 includes an open end 88 having a saddle shape and size corresponding to fourth opening 82 and is joined to rack 14 by a seam weld 90 between opening 82 and open end 88, as shown in FIG. 3.

Figure 5:
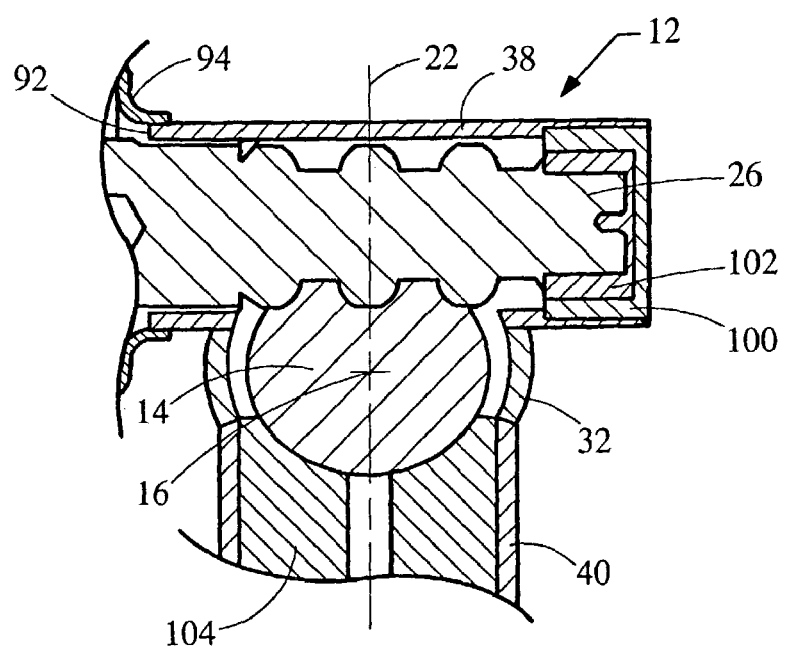
FIG. 5 is a cross sectional view of the steering system in FIG. 1 taken along line 5-5.

Referring now to FIG. 5, the arrangement of assist pinion 26 and rack 14 within rack section 32, assist pinion section 38, and yoke section 40 of housing 12 is depicted. A flange 94 is welded to assist pinion section 38 at a first end 92 and contains a radial bearing about assist pinion 26. A second end 98 is internally machined to provide an enlarged diameter to receive a needle bearing 100 that engages an inner race 102 affixed to the end of assist pinion 26. Within yoke section 40 opposite assist pinion 26 is a roller yoke 104 that biases rack 14 against pinion 26. Electric motor 28 is attached to flange 94 by bolts, and also to rack 14 by a bracket 106.

Therefore, this invention provides a composite tubular housing that is formed by welding together sections of seamless metal tubing into an integral component. It is an advantage of this invention that the housing includes an elongated tube section for the rack. Thus, a single housing provides support for multiple components that engage the rack in locations that are spaced apart such as the drive pinion and the assist pinion that engage opposite ends of the rack in the described embodiment. In addition, the housing includes sections for receiving yokes for biasing the rack opposite the pinions. This is accomplished in a single component that is readily manufactured without requiring complicated coring, and so produces a housing with reduced cost.

While this invention has been described in terms of certain embodiments thereof, it is not intended to be limited to those embodiments, but rather only to the extent set forth in the claims that follow.

The invention claimed is:

1. A composite tubular housing for an automotive steering system that includes a rack, a drive pinion engaging the rack, and a yoke biasing the rack against the drive pinion, comprising:

a rack section for receiving the rack, said rack section being formed of a seamless metal tube symmetrical about a first axis, said rack section defining a first and second openings symmetrical about a second axis perpendicular to the first axis;

a drive pinion section for receiving the drive pinion, said drive pinion section being formed of a seamless metal tube symmetrical about a pinion axis perpendicular to said second axis, said drive pinion section comprising a drive pinion section opening symmetrical about the second axis and welded to said rack housing about the first opening;

a yoke section receiving the yoke, said yoke section formed of a seamless metal tube, said yoke section being symmetrical about the second axis and comprising an open end welded to said rack housing about the second opening said rack section further defining third and fourth openings symmetrical about a third axis perpendicular to the first axis and spaced apart from the second axis;

said rack section further defining third and fourth openings symmetrical about a third axis perpendicular to the first axis and spaced apart from the second axis;

an assist pinion section for receiving an assist pinion, said assist pinion section being formed of a seamless metal tube symmetrical about an assist pinion axis perpendicular to said third axis, said assist pinion section comprising an assist pinion opening symmetrical about the third axis and welded to said rack housing about the third opening, an assist yoke section for receiving the assist yoke, said assist yoke section being formed of a seamless metal tube symmetrical about the third axis, said assist yoke section comprising an open end welded to said rack housing about the second opening, and a flange coupled to assist pinion section, the flange flaring outwardly and attached to an electric motor.

2. A composite tubular housing in accordance with claim 1 wherein the first opening is a saddle-shaped opening, and wherein the drive pinion section opening is sized and shaped corresponding to the saddle-shaped opening.

3. A composite tubular housing in accordance with claim 1 wherein the assist pinion section comprises an open end for receiving a needle bearing.

4. A composite tubular housing in accordance with claim 1 wherein the first opening is a saddle-shaped opening, and wherein the drive pinion section is attached to the rack section by a seam weld between the saddle-shaped opening and the drive pinion opening and provides access for the drive pinion to engage the rack.

5. A composite tubular housing in accordance with claim 1 wherein the third opening is a saddle-shaped opening, and wherein the assist pinion section is attached to the rack section by a seam weld between the saddle-shaped opening and the assist pinion opening and provides access for the assist pinion to engage the rack.

* * * * *